United States Patent
Lyons et al.

[11] Patent Number: 6,155,694
[45] Date of Patent: Dec. 5, 2000

[54] COMPOSITE WARNING LIGHT WITH EMISSION PATTERN MATCHING

[75] Inventors: H. Wayne Lyons, Edgewater, Fla.; James L. Stopa, Old Saybrook, Conn.

[73] Assignee: Whelen Engineering Company, Inc., Chester, Conn.

[21] Appl. No.: 09/150,851

[22] Filed: Sep. 10, 1998

Related U.S. Application Data

[63] Continuation-in-part of application No. 09/061,450, Apr. 16, 1998, abandoned.

[51] Int. Cl.[7] .................................................. F21S 3/00
[52] U.S. Cl. .................... 362/228; 362/221; 362/222; 362/225; 362/235; 362/236; 362/245; 340/331; 340/471; 340/478; 315/178; 315/182; 315/183; 315/241 S
[58] Field of Search .................. 362/221, 222, 362/225, 228, 235, 236, 237, 240, 241, 244, 245, 251; 315/200 A, 178, 182, 183, 241 S; 340/331, 471, 478

[56] References Cited

U.S. PATENT DOCUMENTS

| | | |
|---|---|---|
| 2,078,573 | 4/1937 | Johnson . |
| 2,960,679 | 11/1960 | Atkins . |
| 3,519,984 | 7/1970 | Zychal . |
| 3,688,259 | 8/1972 | Rebillt . |
| 3,895,345 | 7/1975 | Elvers et al. . |
| 3,903,501 | 9/1975 | Greenlee et al. . |
| 4,206,498 | 6/1980 | Kader ......................................... 362/72 |
| 4,480,211 | 10/1984 | Eggers . |
| 4,958,143 | 9/1990 | Knauff . |
| 5,045,982 | 9/1991 | Lyons ...................................... 362/241 |
| 5,319,367 | 6/1994 | Schulte et al. . |
| 5,658,067 | 8/1997 | Engle et al. ............................. 362/222 |
| 5,785,413 | 7/1998 | Tillinghast et al. ..................... 362/228 |
| 6,056,416 | 5/2000 | Ngai et al. ............................... 362/225 |

*Primary Examiner*—Sandra O'Shea
*Assistant Examiner*—Anabel M. Ton
*Attorney, Agent, or Firm*—Alix, Yale & Ristas, LLP

[57] ABSTRACT

A multi-flash strobe light pattern is superimposed on each individual light pulse produced by an incandescent lamp to provide a warning signal of enhanced visibility in a particulate laden ambient environment. The first pulse of each multi-flash strobe pattern is delayed for a time period, subsequent to energization of the incandescent lamp, which is equal to at least 80% of the time required for the incandescent lamp to achieve its maximum light output intensity.

30 Claims, 6 Drawing Sheets

COMPOSITE WARNING LIGHT WITH EMISSION PATTERN MATCHING

CROSS-REFERENCE TO RELATED APPLICATION

The present application is a continuation-in-part of Application Ser. No. 09/061,450 filed Apr. 16, 1998, now abandoned.

BACKGROUND OF THE INVENTION

1. Field of the Invention

The present invention relates to providing a visual warning of the presence of an emergency or highway maintenance vehicle and, particularly, to the generation of plural, multiple intensity, overlapping light flash patterns which afford enhanced visibility in the presence of particulate matter in the ambient atmosphere. More specifically, this invention is directed to a warning light employing two different types of light generator and, especially, to such a warning light wherein the two types of light generator provide pulses having differing lengths and maximum light intensity and are controlled to produce overlapping flash patterns which enhance visibility in the presence of reflective particulate matter in the operating environment. Accordingly, the general objects of the present invention are to provide novel and improved methods and apparatus of such character.

2. Description of the Prior Art

While not limited thereto in its utility, the present invention is particularly well suited for use in providing a visual warning of the presence of official vehicles under inclement atmospheric conditions such as snow, rain or fog. Thus, for purposes of illustration, the present invention will be described in association with the potential use thereof on slow moving vehicles employed in snow removal. Such vehicles must, of course, "announce" their presence to other vehicles on the roadway. Safety considerations dictate that such other vehicles be warned of the presence of the snow removal vehicle from as great a distance as possible since, under conditions of snow removal, vehicle stopping distances are exaggerated. At the same time, the means by which the presence of the snow removal vehicle is announced must not "blind" the operator of either that vehicle or any approaching vehicles to hazards such as, for example, stalled vehicles or other traffic which is being overtaken.

The two above briefly-discussed requirements have, in the past, presented a dilemma to the designer of a warning light. Maximum distance visibility requires that the light pulses generated by a warning light be as intense as possible. Maximum light intensity, in turn, dictates the employment of a "strobe" light, i.e., a periodically energized gaseous discharge tube. Strobe lights generate intense, short duration light pulses with a relatively high pulse repetition rate. Such high frequency light pulses, in a clear atmosphere, are readily visible from a safe stopping distance and do not interfere with the ability of the operator of the vehicle on which the strobe light is mounted to see potential obstructions. In the presence of falling snow, however, as a result of the frequency of the generated light pulses and the movement of the vehicle, a stroboscopic effect may occur. That is, the snow particles will appear to stop in space, i.e., there is an inherent tendency for the eyes of an observer to focus on the particles and this tendency, at the very least, presents a distraction. Additionally, the light reflected from the "stopped" or apparently slow moving particles, partly as a consequence of the relatively slow reaction time of the iris of the human eye to changes in light intensity, may "blind" both the operator of the vehicle on which the strobe light is mounted and the operators of any approaching vehicles, i.e., the bright and substantially constant light resulting from reflection can significantly impede the ability of individuals to detect objects. In summary, under ambient conditions such as blowing snow, dense fog or rain, a strobe light may not afford the optimum solution to the problem of safely providing a readily noticeable visual warning of the presence of an emergency vehicle.

As an alternative to the employment of a gaseous discharge tube light source in a warning light, resort may be had to certain types of incandescent lamps which generate relatively intense light. Thus, warning lights for emergency vehicles often employ, for example, periodically energized halogen lamps. The maximum intensity of the light generated by a halogen lamp is, however, less than that which will be generated by a flash tube. As a general rule, accordingly, a halogen lamp, even when the light generated thereby is focused employing a mirror and/or lens, cannot be seen from as great a distance as a strobe light. The flash repetition rate obtainable from an incandescent lamp is much lower than that customarily generated by a strobe light and will typically be at a frequency which will not result in a stroboscopic effect in the operating environment being discussed. In summary, while employment of an incandescent lamp can avoid the possibility of the above-discussed stroboscopic effect, the reduced penetration, resulting from the lower peak intensity of the incandescent lamp when compared to a strobe light, dictates against the use of an incandescent lamp in a warning light intended for use where visibility is drastically reduced by air borne particles.

Enhancement of the noticeability of incandescent lamps by combining such lamps with a high intensity light source such as a flash tube has previously been proposed. In such prior art combinations, for example as exemplified by the traffic signal disclosed in U.S. Pat. No. 3,895,345, the two different light generators cooperate with a common reflector. Accordingly, at least one of the sources must be displaced from the focal point of the reflector and the available light is thus not utilized in the most efficient manner. Typically, the flash tube has been located so as to surround the incandescent lamp and the reflected light emanating from the flash tube is thus not columnated into a focused beam which affords maximum visibility. Combined light sources for use on emergency vehicles have also been proposed as disclosed in U.S. Pat. Nos. 4,480,211 and 4,958,143. The individual light generators of the prior art systems, as disclosed in these patents, have not been subjected to control in a manner which will provide a light output which takes advantage of the attributes of both types of source while reducing or eliminating the disadvantages thereof when operated in the environment of a particulate matter laden ambient atmosphere.

SUMMARY OF THE INVENTION

The present invention overcomes the above-briefly discussed and other deficiencies and disadvantages of the prior art and, in so doing, provides a novel and improved warning light and a technique for controlling the simultaneous operation of at least a first incandescent lamp and a flash tube employed in such light. Such dual, diverse light sources, when controlled in accordance with the invention, achieve the penetrating effect of the high intensity strobe light without creating a stroboscopic effect. This improvement is accomplished by "embedding" a multi-flash light pattern produced by a strobe light within each light pulse generated by an associated incandescent lamp.

The present invention also encompasses the association of at least a first incandescent lamp and a flash tube with individual reflectors which are closely spaced in an integrated reflector subassembly. In accordance with a first embodiment, a common lens, having optics for redirecting light which is generated by the incandescent lamp(s) only, is mounted to the reflector subassembly.

A warning light in accordance with a first embodiment of the invention comprises a strobe light, i.e., a flash tube, and an associated incandescent lamp, preferably a halogen lamp, supported within a common "light head". The light head is provided with optics which manipulate the light generated by the two diverse sources to produce a pair of wide angle "beams" and to cause these beams to effectively overlap. The light head thus provides a visually observable warning signal which, to a distant observer, appears to originate from a single light source. Also in accordance with the invention, the associated incandescent lamp and strobe light are controlled such that, during each energization of the incandescent lamp, the triggering of the flash tube is delayed until subsequent to the generation of visible light by the incandescent lamp. The control of the present invention modulates the energizing current delivered to the incandescent lamp so as to cause the incandescent lamp to be operated at a preselected low frequency, i.e., the incandescent lamp will generate between 60 and 90 flashes per minute. During the energization phase of each cycle of the incandescent lamp, after a delay sufficient to ensure that the filament of the incandescent lamp has reached an operating temperature which will result in the generation of visible light, the control will trigger the strobe light to generate multiple high intensity light pulses. In one reduction to practice of the invention, the strobe light was triggered four times, i.e., produced four short duration high intensity light pulses, during each light pulse generated by the associated halogen lamp.

In accordance with a further embodiment of the invention, the strobe light was in the form of a linear flash tube and a pair of incandescent, i.e., halogen, lamps were located adjacent the opposite ends of the linear flash tube. The two thus spacially displaced halogen lamps are simultaneously energized. The linear flash tube is associated with a parabolic trough reflector which, in accordance with one enhancement, includes supplemental reflective surfaces which enable utilization of generated light which would otherwise be lost by, for example, reflection directly back to the light source.

BRIEF DESCRIPTION OF THE DRAWING

The present invention may be better understood, and its numerous objects and advantages will become apparent to those skilled in the art, by reference to the accompanying drawing wherein like reference numerals refer to like elements in the several Figures and in which.

DESCRIPTION OF THE DISCLOSED EMBODIMENT

Figure 1:
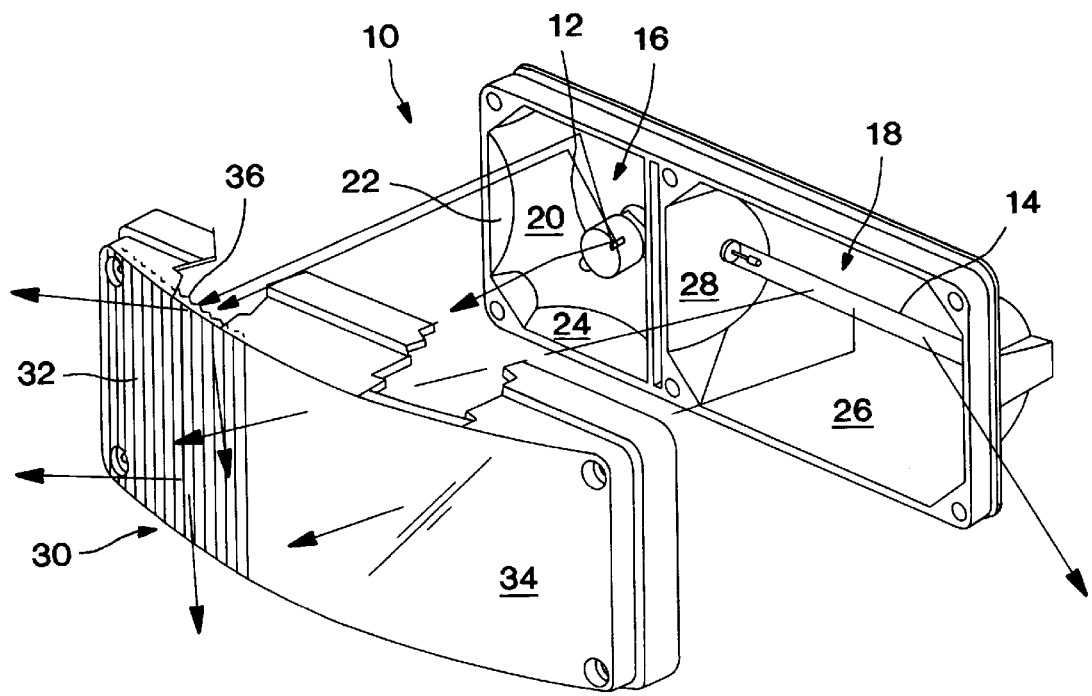
FIG. 1 is an exploded perspective view which schematically illustrates a light head in accordance with the invention.
Figure 2:
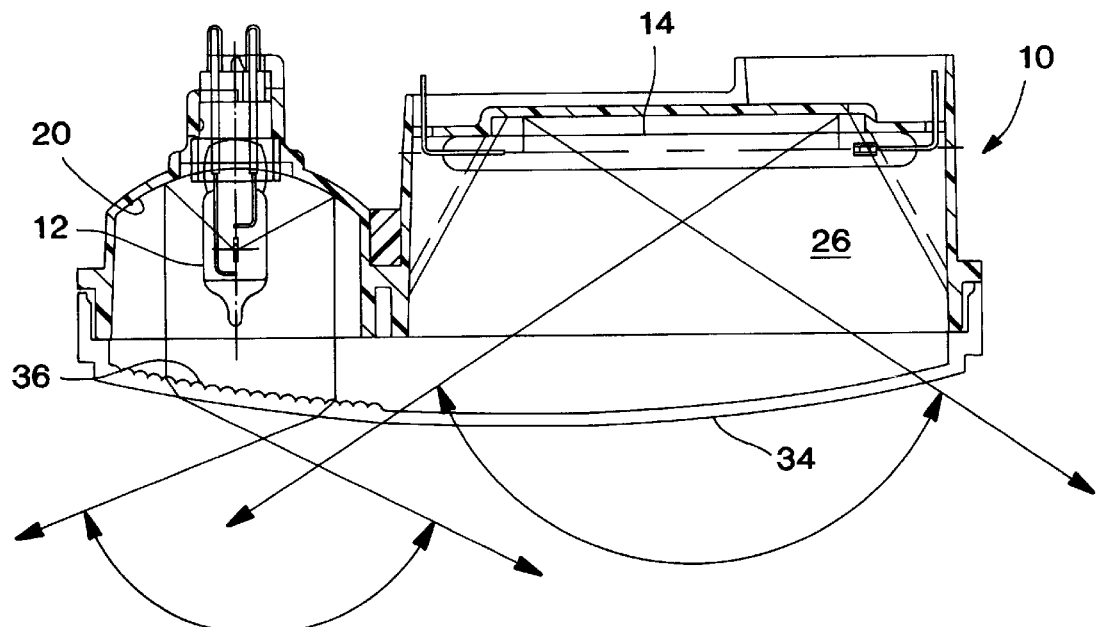
FIG. 2 is a cross-sectional, top plan view of the light head of FIG. 1.

FIGS. 1 and 2 illustrate an exemplary light head, indicated generally at 10, which supports an incandescent light 12, typically a halogen lamp, and a linear gaseous discharge tube 14, typically a flash tube filled with a mixture which includes xenon gas. The light head 10 will conventionally be comprised of molded plastic parts and the surfaces thereof which are to function as reflectors will be metalized through the deposition of a coating of aluminum thereon. In the example being described, lamp 12 will be associated with a reflector 16 and flash tube 14 will be associated with a reflector 18, the reflectors and supports for the light sources 12 and 14 being integrated into a single component.

Reflectors 16 and 18 will redirect light from the associated light generator which is incident thereon. In the environment of a warning light, to insure visibility from the greatest distance, a significant portion of the reflected light will be collimated into a "beam". Accordingly, reflectors 16 and 18 will each include a primary reflective surface which is a parabolic surface of revolution about an axis. Reflector 16 thus has a primary parabolic surface of revolution 20 which, in the interest of volummetric efficiency, terminates at pairs of flat secondary reflective surfaces 22 and 24. The filament of halogen lamp 12, which is essentially a point source of light, lies on the focal point of reflective surface 20. Light which originates at the filament of lamp 12 and is intercepted by reflector 16 will be collimated into a forwardly directed beam as represented by the parallel light ray traces on FIGS. 1 and 2.

Reflector 18 is a "parabolic trough" comprising a primary parabolic reflective surface 26 having a linear focal point. Reflector 18 also includes, in the disclosed embodiment, and a pair of secondary reflectors in the form of flat reflective ends 28. To the extent permitted by manufacturing tolerances, an extension of the linear focal point of surface 26 preferably intersects the axis of reflector 16 at or adjacent to the focal point of reflector 16. Flash tube 14 is supported so that the linear gaseous discharge created therein will be approximately axially coincident with the linear focal point of reflective surface 26. In the manner well understood in the art, light generated by flash tube 14 which impinges on reflective surface 26 will be focused into a forwardly directed "beam", i.e., a generally fan-shaped band of light comprising rays which are parallel to a horizontal plane through the linear focal point. It will be understood by those skilled in the art that at least some of the secondary reflective surfaces of reflectors 16 and/or 18 may be parabolic surfaces which share a common focal point with their associated primary reflector, such secondary parabolic reflectors being "aimed" to obtain the desired light emission pattern from the reflector/light source combination.

The focused beam of the light generated by halogen lamp 12 and the diverging band of the light produced by the combined action of linear source 14 and reflective surface 26 will be passed through a common lens 30. Lens 30, in the disclosed embodiment, includes a first portion 32 and an adjacent, integral second portion 34. Portion 32 of lens 30 will, when the light is assembled, be disposed to intercept the columnated light originating from source 12. Lens portion 34 will, with the light assembled, be disposed to intercept the light produced by linear source 14 and focused by reflector 18. Lens portion 32 is provided, on the surface thereof which faces reflector 16, with optics in the form of spreader elements 36. The spreader elements cause light passing therethrough to be selectively redirected so as to provide a light beam which is fan-shaped, i.e., diverging, in the horizontal direction. The action of the spreader elements 36 can be seen from the directional ray trace arrows on FIGS. 1 and 2. In the disclosed embodiment, lens portion 34 does not include any optics and thus portion 34 of lens 30 has minimal effect on light passing therethrough.

The combined effect of reflectors 16 and 18 and lens 30 is to produce, from a pair of diverse light sources positioned at the focal points of separate associated reflectors, radiation patterns which overlap. Restated, the light head of FIGS. 1 and 2 manipulates light emitted by adjacent point and linear sources such that overlapping, wide-angle light beams concentrated in a substantially common horizontal plane are produced. The angles of divergence in the horizontal plane of the light originating from sources 12 and 14 are represented by a pair of arcuate, double-ended arrows on FIG. 2, these angles of divergence being approximately equal in the disclosed embodiment. The light passing through lens 30, to a "distant" observer, will appear to be produced by a single source.

Figure 4:
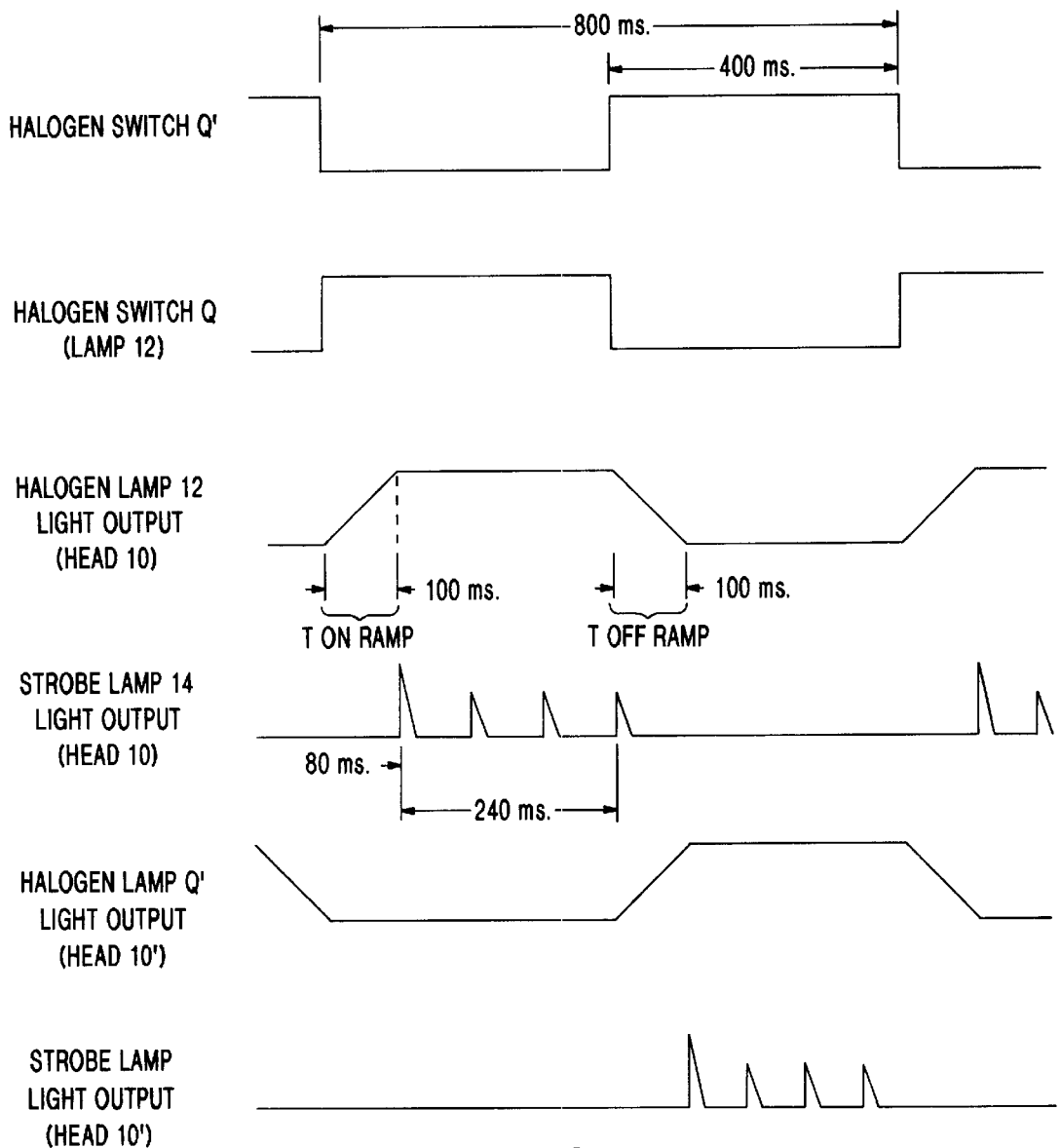
FIG. 4 is a wave form diagram which graphically explains the operation of the control of FIG. 3 as associated with a pair of the light heads of FIG. 1.
Figure 5:
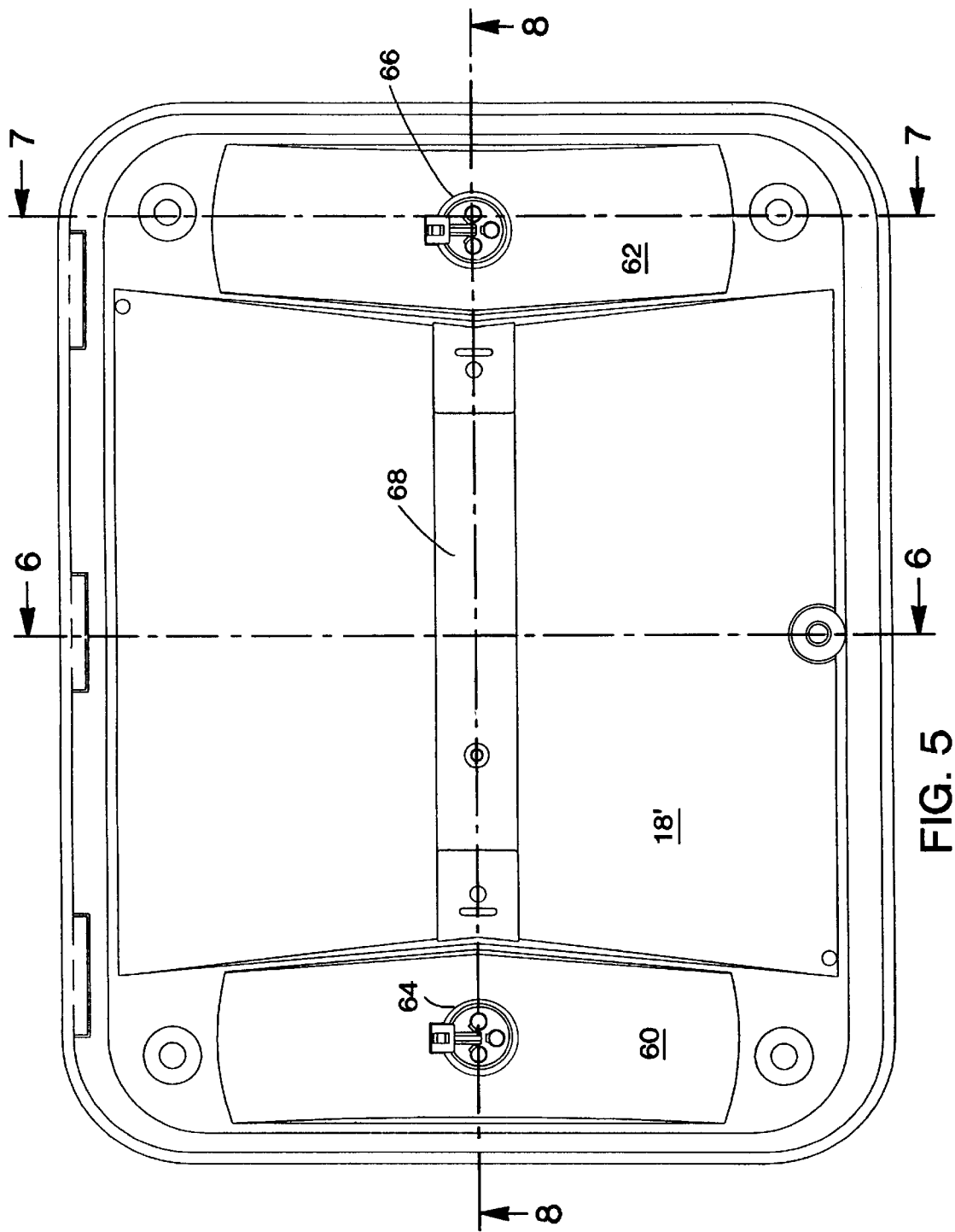
FIG. 5 is a front elevation view of the reflector of a second embodiment of a light head in accordance with the invention.

In accordance with the invention, and as graphically represented in FIG. 4, the light sources 12 and 14 of a light head 10 are controlled so as to minimize the possibility that the above-discussed stroboscopic effect will be encountered. The halogen lamp 12 is preferably operated with a duty cycle of approximately 50% and with a pulse repetition rate in the range of 60 to 90 flashes per minute. This will result in pulses of visible light having a duration in the range of 333 ms to 500 ms being emitted by halogen lamp 12. This flashing of halogen lamp 12 is accomplished by modulating the current flow through the filament of the lamp. The load presented by lamp 12 to the drive circuit which provides the energizing current will be a function of the physical dimensions of the filament, which is primarily a function of the rated power of the lamp, and the filament temperature. When lamp 12 is operated in a pulsed mode, i.e., when the lamp is caused to produce periodic bursts of light, there will inherently be a delay between the time of initiation of, or an increase in, the flow of energizing current and the time the filament temperature reaches a level where a significant quantity of visible light will actually be emitted. The two upper wave forms of FIG. 4 represent the switch control signals Q and Q' for the halogen lamps of a pair of light heads 10, 10' of the type depicted in FIGS. 1 and 2. As may also be seen from FIG. 4, there is a time delay, i.e., a "T on ramp" period, between generation of an "on" command and achievement of maximum light emission from the incandescent lamp. In FIG. 4, this delay is indicated as 100 ms.

In accordance with the present invention, the energization of the flash tube 14 of a light head 10 will be delayed until the associated halogen lamp 12 is producing a significant amount of visible light. In the example represented by FIG. 4, a first gating pulse for causing ionization of the gas in flash tube 14 will be delayed, during each cycle of the composite light of FIG. 1, for a time period which is at least equal to 80% of the "T on ramp" time required for incandescent lamp 12 to achieve maximum brightness.

Subsequent to the generation of an initial energizing command signal for flash tube 14, i.e., after the requisite delay, the flash tube will be repeatedly "fired". As depicted in FIG. 4, flash tube 14 will preferably be controlled so as to generate four high intensity light pulses during each "on" period of halogen lamp 12. Representative circuitry for causing such repetitive triggering of flash tube 14, i.e., a strobe power converter, is disclosed in U.S. Pat. No. 5,013,973.

Figure 3:
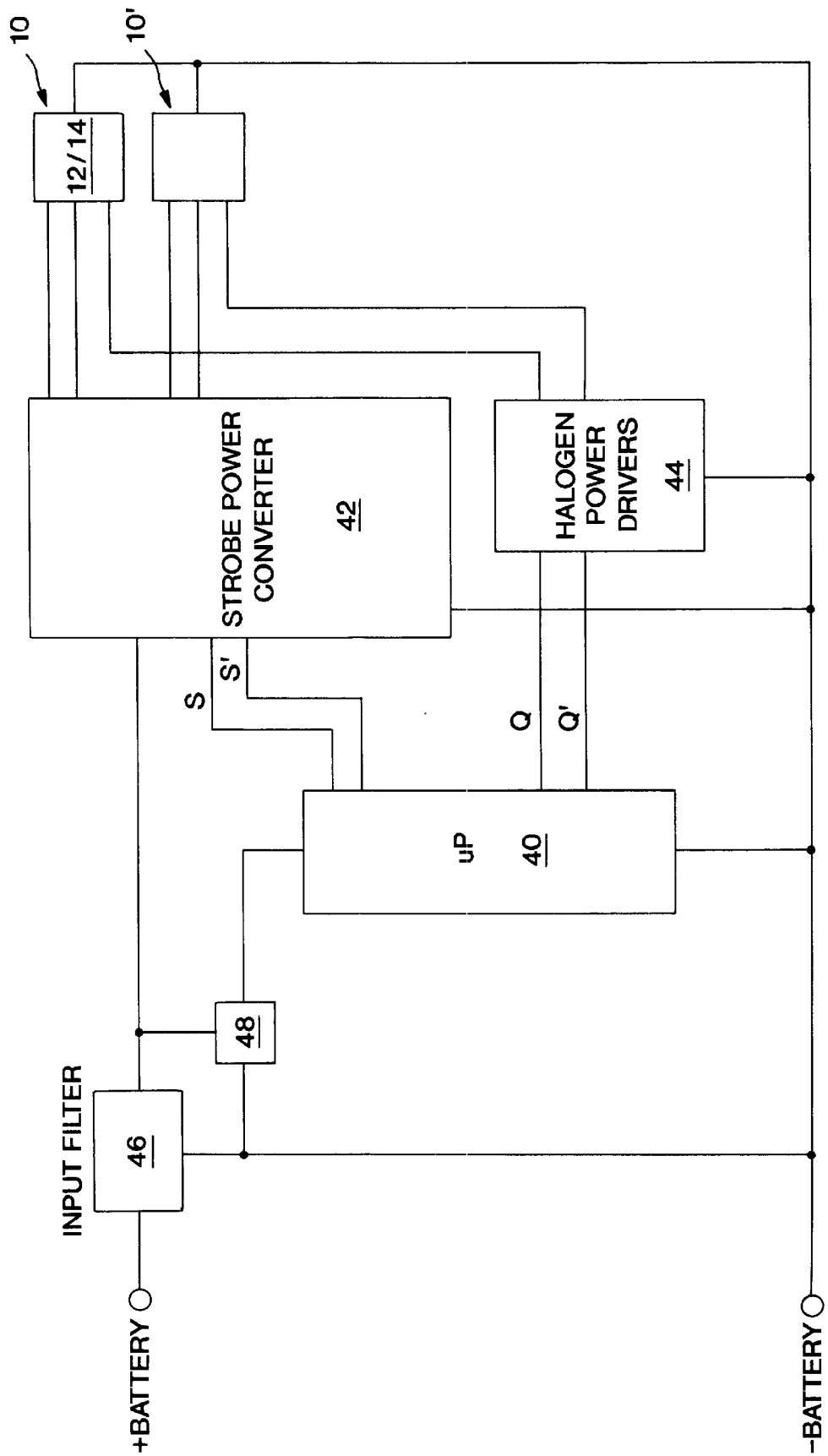
FIG. 3 is a circuit block diagram of a control for a pair of the light heads of FIG. 1.

Referring to FIG. 3, the command signals which control the pulsing of halogen lamp 12 and the delayed synchronized firing of flash tube 14 may most advantageously be generated under the control of a microprocessor 40. If the above-discussed delay is solely a function of time, the delay may be set, i.e., programmed, at the factory as a function of the known average "T on ramp" time of the particular type of halogen lamp to be employed in light head 10. Alternatively, the control for light head 10 may permit selection of the delay by the end user in the field. As a further alternative, the delay may be dynamically controlled by sensing the current through the filament of the halogen lamp, i.e., by indirectly monitoring the light output of lamp 12.

The power supply for flash tube 14 will be disabled in the absence of an energizing signal for the associated incandescent lamp 12. Restated, at the beginning of the "T off ramp" portion of the operating cycle of lamp 12, when the current to lamp 12 is interrupted or reduced to "turn the lamp off", the flash tube will be prevented from generating any further light until that portion of the next cycle of the halogen lamp when visible light is being generated.

Circuitry for implementing the above-described control mode is depicted in block diagram in FIG. 3. This circuitry comprises the above-mentioned microprocessor 40, a strobe power converter 42 and drivers 44 for the incandescent lamps 12. In the operating environment of a motor vehicle, the circuitry of FIG. 3 will be connected across the DC power supply of the vehicle, i.e., the battery, and the power supply voltage will be filtered by means of an input filter 46. The strobe power converter 42 will be connected between the filtered input voltage and ground. The microprocessor 40 will be connected in series with a voltage regulator 48. Microprocessor 40 will be programmed to generate the switching control signals Q and Q' for the drivers 44 and the command signals S and S' for controlling the energization of the linear flash tubes. The drivers 44 for the incandescent lamps 12 may, for example, each comprise an amplifier connected to the vehicle power supply, and responsive to the microprocessor generated switching control signals, and a solid state switch. The switches will also be responsive to the command signals and will be connected in series with the amplifier and lamp filament.

The embodiment depicted in FIGS. 5–8 differs from the above-discussed embodiment of FIGS. 1 and 2 primarily in the use of a pair of spacially displaced incandescent lamps. Thus, the integrated reflector of the light head includes, respectively disposed at opposite ends of a parabolic trough reflector 18', reflectors 60 and 62. Reflectors 60 and 62 are functionally substantially the same as the reflector 16 of the light head of FIGS. 1 and 2. A line intersecting the focal points FP of reflectors 60 and 62 will, to the extent permitted by manufacturing tolerances, be parallel with and displaced slightly forward of the linear focal point of parabolic trough 18'. The halogen lamps which are received and supported in the sockets comprising reflectors 60 and 62, the sockets being respectively indicated at 64 and 66, will be simultaneously energized.

The embodiment of FIGS. 5–8 will employ a lens, not shown, which may include optical spreader elements 36 (see FIG. 2) which extend across the entire width of the lens. Alternately, the spreaders may be disposed only in front of the reflectors 60 and 62.

The embodiment of FIGS. 5–8 has the advantage of enabling the utilization of lower wattage halogen lamps than would be employed in the embodiment of FIGS. 1 and 2.

Figure 6:
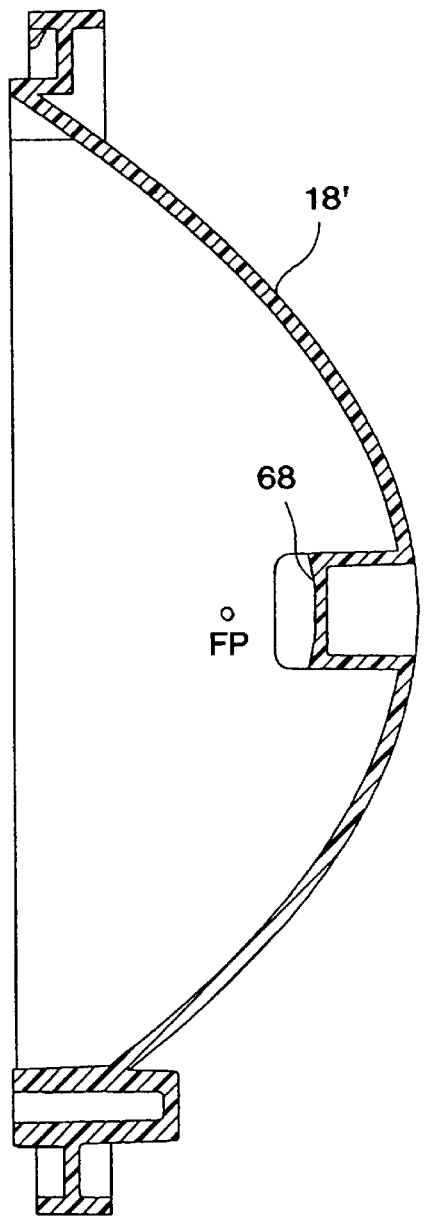
FIG. 6 is a cross-sectional, side elevation view taken along the line 6—6 of FIG. 5.
Figure 7:
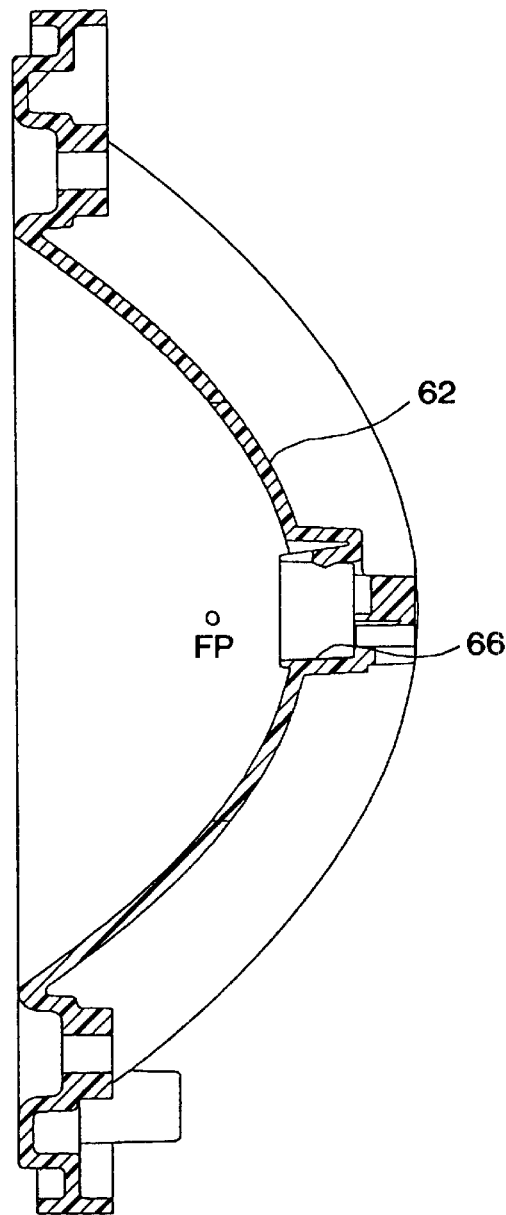
FIG. 7 is a cross-sectional, side elevation view taken along the line 7—7 of FIG. 5.
Figure 8:
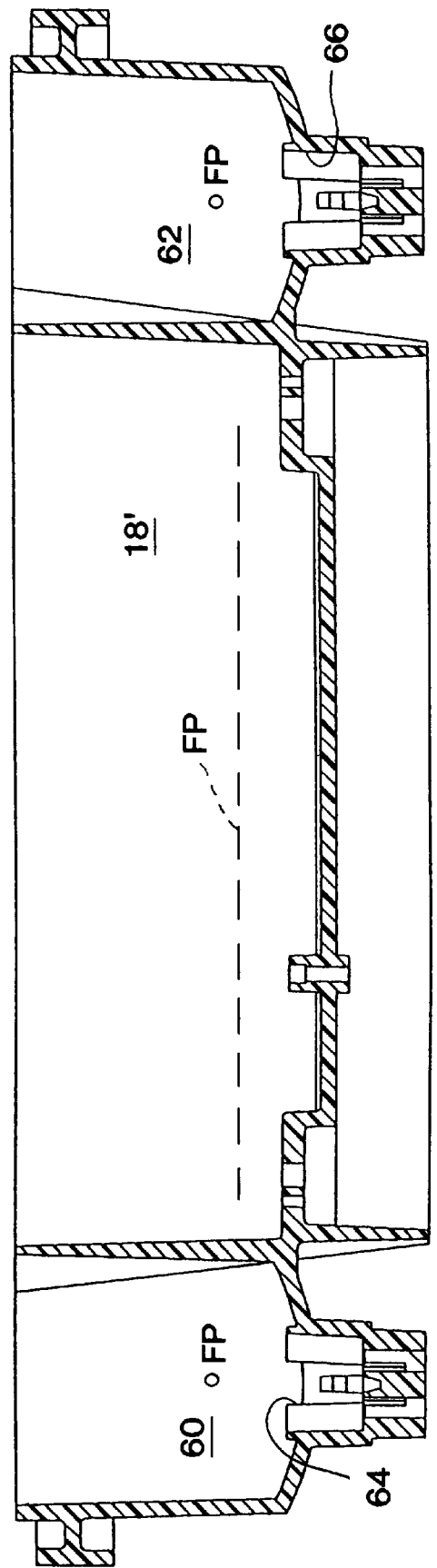
FIG. 8 is a cross-sectional view of the reflector of FIG. 5, FIG. 7 being a view taken along line 7—7 of FIG. 5.

As a further enhancement, the parabolic trough reflector 18' of the embodiment of FIGS. 5–8 is provided with an auxiliary reflector 68 which, as best seen from FIG. 6, is located behind the focal point of the parabolic trough. Reflector 68 defines a pair of parabolic surfaces, located respectively above and below a plane through the focal point of trough 18', which have the same focal point as the primary parabolic trough, i.e., the two linearly extended parabolic surfaces of reflector 68 and parabolic trough 18' have a common focal point. However, the reflective surfaces of auxiliary reflector 68 are each rotated such that light instant thereon will not be reflected back toward the linear flash tube but, rather, will be angularly directed with respect to the center line of the parabolic trough. Accordingly, in the embodiment of FIGS. 5–8, generated light which would typically be lost by reflection back into the light source will be transmitted through the lens as diverging light rays.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A warning light comprising:
    a light band generator, said light band generator including:
        a first reflector, said first reflector including at least a first concave reflective surface which defines an elongated parabolic trough having a linear focal point and first and second ends;
        a linear gaseous discharge tube, said tube having an axis; and
        means supporting said tube in proximity to said first reflector, said tube supporting means positioning said tube approximately coaxially with said linear focal point whereby light emitted by said tube and incident on said first reflective surface of said first reflector will be focused into light rays defining a band of light;
    at least a first light beam generator, said first light beam generator being juxtapositioned to one of said ends of said first reflector and including:
        a second reflector, said second reflector including at least a first concave reflective surface which defines a paraboloid of revolution about a second axis, said paraboloid of revolution of said second reflector having a focal point lying on said second axis;
        a first incandescent lamp having a filament; and
        means supporting said first lamp in proximity to said second reflector, said supporting means for said first lamp positioning said filament of said first lamp to intersect said focal point of said second reflector whereby light emitted by said first lamp and incident on said first reflective surface of said second reflector will be collimated into a first light beam comprising light rays which are substantially parallel to said second axis, some of the light rays comprising said first beam being approximately parallel to light rays comprising said light band;
        means for redirecting at least some of the light rays comprising said first beam to cause said first beam to diverge, the radiation patterns of light simultaneously emitted by said first lamp and said tube thereby at least in part overlapping; and
    a control circuit for periodically energizing said first lamp and said tube to cause said first lamp and tube to emit pulses of light, the light pulses produced through energization of said first lamp being of longer duration than the light pulses produced through energization of said tube, said control circuit sequentially energizing said first lamp and said tube whereby said tube will produce at least a first light pulse during each light pulse produced by said first lamp, the delay between said sequential energization of said first lamp and said tube causing the light pulses of said light band generator to be superimposed on the light pulses of said first light beam generator.

2. The warning light of claim 1 wherein said first and second reflectors are integral.

3. The warning light of claim 1 further comprising:
    a second light beam generator, said second light beam generator being juxtapositioned to the other of said ends of said light band generator and including:
        a third reflector, said third reflector including at least a first concave reflective surface which defines a paraboloid of revolution about a third axis, said paraboloid of revolution of said third reflector having a focal point lying on said third axis;
        a second incandescent lamp having a filament; and
        means supporting said second lamp in proximity to said third reflector, said second lamp supporting means positioning said second lamp filament to intersect said focal point of said third reflector whereby light emitted by said second lamp and incident on said first reflective surface of said third reflector will be collimated into a second light beam comprising light rays which are substantially parallel to said third axis, said second beam being substantially parallel to said first beam, said second light beam passing through said means for redirecting whereby the radiation pattern of light emitted by said second lamp and said tube will at least in part overlap.

4. The warning light of claim 1 wherein said means for redirecting comprises:
    a common lens disposed to intercept both said first light beam and said light band, said lens including optical elements positioned in registration with at least said first light beam generator, said optical elements angularly redirecting some of the light rays comprising said first beam with respect to said second axis.

5. The warning light of claim 1 wherein said control circuit comprises:
    a switch circuit responsive to switch command signals for supplying modulated current flow to said first incandescent lamp, said switch circuit periodically delivering sufficient current to the filament of said first lamp to cause said first lamp to emit a pulse of visible light for a predetermined time period, there being a time delay between initiation of said current delivery to said first lamp and the intensity of the emitted light attaining a maximum level;
    a strobe power conversion circuit connected to said tube and responsive to energization command signals for periodically establishing a discharge in said tube whereby a pulse of light is emitted by said tube; and a command signal generator for synchronizing the emission of light by said incandescent lamp and said gaseous discharge tube, said command signal generator generating a first energization command signal for causing the establishment of a discharge in said tube at a time after the generation of a switch command signal for said lamp which is at least equal to 80% of the time delay required for the intensity of the light emitted by said first lamp to reach its maximum intensity, said command signal generator subsequently generating at least a second energization command signal during the period said first lamp is emitting light whereby said tube will emit plural pulses of light during each predetermined time period when said first incandescent lamp is emitting visible light.

6. The warning light of claim 5 wherein said command signal generator provides switch command signals which cause said first incandescent lamp to operate with approximately a 50% duty cycle and to produce pulses of visible light having a duration in the range of 333 ms to 500 ms.

7. The warning light of claim 6 wherein said command signal generator provides energization command signals which cause said gaseous discharge tube to produce four light pulses during each light pulse provided by said first incandescent lamp.

8. The warning light of claim 1 wherein said first incandescent lamp is a halogen lamp and said gaseous discharge tube is an xenon flash tube.

9. The warning light of claim 5 wherein said first and second reflectors are integral.

10. The warning light of claim 9 wherein said means for redirecting comprises:
 a common lens disposed to intercept said first light beam and said light band, said lens including optical elements positioned in registration with at least said light beam generator, said optical elements angularly redirecting some of the light rays comprising said first beam with respect to said second axis.

11. The warning light of claim 10 wherein said command signal generator provides switch command signals which cause said first incandescent lamp to operate with approximately a 50% duty cycle and to produce pulses of visible light having a duration in the range of 333 ms to 500 ms.

12. The warning light of claim 11 wherein said first incandescent lamp is a halogen lamp and said gaseous discharge tube is an xenon flash tube.

13. The warning light of claim 12 wherein said command signal generator provides energization command signals which cause said gaseous discharge tube to produce four light pulses during each light pulse provided by said first incandescent lamp.

14. The warning light of claim 3 wherein said first, second and third reflectors are integral.

15. The warning light of claim 3 wherein said control circuit causes said first and second incandescent lamps to be substantially simultaneously energized.

16. The warning light of claim 15 wherein said first, second and third reflectors are integral.

17. The warning light of claim 16 wherein said means for redirecting comprises:
 a common lens disposed to intercept said first and second light beams and said light band, said lens including optical elements positioned in registration with at least said first and second light beam generators, said optical elements angularly redirecting some of the light rays comprising said first and second beams respectively with respect to said second and third axes.

18. The warning light of claim 17 wherein said control circuit provides switch command signals which cause said incandescent lamps to operate with approximately a 50% duty cycle and to produce pulses of visible light having a duration in the range of 333 ms to 500 ms.

19. The warning light of claim 18 wherein said incandescent lamps are halogen lamps and said gaseous discharge tube is an xenon flash tube.

20. A method of providing a visual warning signal in a particulate laden environment comprising the steps of:
 juxtaposing a pair of diverse type light generators, a first of said light generators including an incandescent lamp and the second of said generators including a gaseous discharge tube, said generators when energized each producing light radiation patterns consisting of light rays;
 directing some of the light rays comprising the radiation patterns of the first and second light generators so as to cause light rays emanating from the diverse light generators to intersect;
 operating the first light generator in a pulsed mode, there being a time delay between initiation of each pulse and the light emitted by the lamp attaining its maximum intensity, the light pulses provided by the first generator having a first duration; and
 operating the second light generator in a pulsed mode and in synchronism with the operation of the first light generator, the initiation of generation of a first light pulse by the second light generator being retarded during each light pulse provided by the first light generator for a time which equals at least 80% of said time delay, the duration of the light pulses provided by the second light generator being much shorter than said first duration, the second light generator being caused to produce at least a second light pulse during each light pulse of the first light generator.

21. The method of claim 20 wherein the first light generator provides a pulsed light beam and the gaseous discharge tube of the second light generator is a linear flash tube, the second light generator providing a radiation pattern which comprises a diverging light band, wherein the first light generator provides a radiation pattern comprising a beam of parallel light rays, and wherein said step of directing comprises:
 angularly redirecting some of the light rays comprising said beam to cause said redirected rays to intersect light rays comprising said light band.

22. The method of claim 21 wherein the step of operating the first light generator comprises:
 causing the incandescent lamp to operate with approximately a 50% duty cycle and to produce pulses of visible light having a duration in the range of 333 ms to 500 ms.

23. The method of claim 22 wherein the step of operating the second light generator comprises:
 energizing the flash tube to produce four discharges therein during each pulse of visual light provided by the lamp.

24. A warning light comprising: a first light beam generator, said first light beam generator including:
 a first reflector, said first reflector including at least a first concave reflective surface which defines a first paraboloid of revolution about a first axis, said first paraboloid of revolution having a focal point lying on said first axis;
 a first incandescent lamp having a filament; and means supporting said first lamp in proximity to said first reflector, said supporting means for said first lamp positioning said first lamp filament to intersect said focal point of said first reflector whereby light emitted by said first lamp and incident on said first reflective surface of said first reflector will be collimated into a first beam comprising light rays which are substantially parallel to said first axis;

a second light beam generator, said second light beam generator including:
  a second reflector, said second reflector including at least a first concave reflective surface which defines a second paraboloid of revolution about a second axis, said second paraboloid of revolution having a focal point lying on said second axis, said first and second axes being approximately parallel and thereby defining a plane;
  a second incandescent lamp; and
  second lamp in proximity to said second reflector, said supporting means for said second lamp positioning said filament of said second lamp to intersect said focal point of said second reflector whereby light emitted by said second lamp and incident on said first reflective surface of said second reflector will be collimated into a second beam comprising light rays which are substantially parallel to said second axis;

a light band generator, said light band generator being juxtapositioned to and located intermediate said first and second light beam generators and including:
  a third reflector, said third reflector including at least a first concave reflective surface which defines an elongated parabolic trough having a linear focal point, said linear focal point lying approximately in said plane:
  a linear gaseous discharge tube, said tube having an axis; and
  means supporting said tube in proximity to said third reflector, said tube supporting means positioning said tube approximately coaxially with said linear focal point whereby light emitted by said tube and incident on said first reflective surface of said third reflector will be focused into light rays defining a band of light:

a lens for redirecting light rays comprising at least some of said first and second light beams and said band of light to cause the radiation patterns of light simultaneously emitted by said lamps and said tube to overlap; and a control circuit for periodically energizing said lamps and said tube to cause said lamps and tube to emit pulses of light, the light pulses produced by said lamps being of longer duration than the light pulses produced by said tube, said control circuit simultaneously energizing said lamps and sequentially energizing said lamps and said tube whereby said tube will produce at least a first light pulse during each light pulse produced by said lamps, the delay between said sequential energization of said lamps and said tube superimposing the light pulses of said light band generator on the light pulses of said light beam generators, said control circuit including:
  a switch circuit responsive to switch command signals for supplying modulated current flow to said incandescent lamps, said switch circuit periodically delivering sufficient current to the filaments of said lamps to cause said lamps to substantially simultaneously emit pulses of visible light for a predetermined time period, there being a time delay between initiation of said current delivery and the intensity of the light emitted by said lamps attaining a maximum level;
  a strobe power conversion circuit connected to said tube and responsive to energization command signals for periodically establishing a discharge in said tube whereby a pulse of light is emitted by said tube; and
  a command signal generator for synchronizing the emission of light by said incandescent lamps and said gaseous discharge tube, said command signal generator generating a first energization command signal for causing the establishment of a discharge in said tube at a time after the generation of a switch command signal for said lamps which is at least equal to 80% of the time delay required for the intensity of the light emitted by said lamps to reach maximum intensity, said command signal generator subsequently generating at least a second energization command signal during the period said lamps are emitting light whereby said tube will emit plural pulses of light during each predetermined time period when said incandescent lamps are emitting visible light.

25. The warning light of claim 24 wherein said first, second and third reflectors are integral.

26. The warning light of claim 25 wherein said command signal generator provides switch command signals which cause said incandescent lamps to operate with approximately a 50% duty cycle and to produce pulses of visible light having a duration in the range of 333 ms to 500 ms.

27. The warning light of claim 1 wherein said light band generator further comprises:
  a supplemental elongated reflective surface located between said parabolic trough and said tube, said supplemental reflective surface being constantly spaced from said axis of said tube and being positioned to intercept light emitted by said tube which travels away from said redirecting means in directions parallel to said second axis, said supplemental elongated reflective surface reflecting light incident thereon toward said redirecting means at angles which cause said reflected light to pass to either side of said tube.

28. The warning light of claim 17 wherein said light band generator further comprises:
  a supplemental elongated reflective surface located between said parabolic trough and said tube, said supplemental reflective surface being constantly spaced from said axis of said tube and being positioned to intercept light emitted by said tube which travels away from said redirecting means in directions parallel to said second and third axes, said supplemental elongated reflective surface reflecting light incident thereon toward said redirecting means at angles which cause said reflected light to pass to either side of said tube.

29. The warning light of claim 25 wherein said light band generator further comprises:
  a supplemental elongated reflective surface located between said parabolic trough and said tube, said supplemental reflective surface being constantly spaced from said axis of said tube and being positioned to intercept light emitted by said tube which travels away from said redirecting means in a direction parallel to said first and second axes, said supplemental elongated reflective surface reflecting light incident thereon toward said redirecting means at angles which cause said reflected light to pass to either side of said tube.

30. A warning light comprising:

at least a first light beam generator, said first light beam generator including:

a first reflector, said first reflector including at least a first concave reflective surface which defines a first paraboloid of revolution about a first axis, said first paraboloid of revolution having a focal point lying on said first axis;

an incandescent lamp having a filament;

means supporting said lamp in proximity to said first reflector, said lamp supporting means positioning said lamp filament to intersect said focal point of said first reflector whereby light emitted by said lamp and incident on said first reflective surface of said first reflector will be collimated into a first beam comprising light rays which are substantially parallel to said axis;

a second light beam generator, said second light beam generator being juxtapositioned to said first light beam generator and including:

a second reflector, said second reflector including at least a first concave reflective surface which defines a parabola, said parabola defined by said second reflective surface having an axis and a focal point which lies on said axis, said first and second reflectors comprising an integrated structure, said axes of said first and second reflectors being substantially parallel and spacially displaced;

a gaseous discharge tube; and means supporting said tube in proximity to said second reflector, said supporting means positioning said tube to intersect said focal point of said second reflector whereby light emitted by said tube will be focused into a second beam by said second reflector, light rays comprising said second beam being approximately parallel to light rays comprising said first beam;

a common lens positioned to intercept said first and second light beams, said lens redirecting light rays comprising at least one of said beams to cause the radiation patterns of light simultaneously emitted by said lamp and said tube to overlap; and a control circuit for periodically energizing said lamp and said tube to cause said lamp and tube to emit pulses of light, the light pulses produced by said lamp being of longer duration than the light pulses produced by said tube, said control circuit sequentially energizing said lamp and said tube whereby said tube will produce a plurality of light pulses during each light pulse produced by said lamp, the delay between said sequential energization of said lamp and the next following energization of said tube superimposing the light pulses of said second light beam generator on the light pulses of said first light beam generator, said control circuit including:

a switch circuit responsive to switch command signals for supplying modulated current flow to said lamp, said switch circuit periodically delivering sufficient current to the filament of said lamp to cause said lamp to emit a pulse of visible light for a predetermined time period, there being a time delay between initiation of said current delivery and the intensity of the emitted light attaining a maximum level;

a strobe power conversion circuit connected to said tube and responsive to energization command signals for periodically establishing discharges in said tube whereby pulses of light are emitted by said tube; and a command signal generator for synchronizing the emission of light by said lamp and said tube, said command signal generator generating a first energization command signal for causing the establishment of a discharge in said tube at a time after the generation of a switch command signal for said lamp which is at least equal to 80% of the time required for the intensity of the light emitted by said lamp to reach its maximum intensity, said command signal generator subsequently generating at least a second energization command signal during the period said lamp is emitting light whereby said tube will emit plural pulses of light during each predetermined time period when said lamp is emitting visible light.

* * * * *

UNITED STATES PATENT AND TRADEMARK OFFICE
CERTIFICATE OF CORRECTION

PATENT NO.   : 6,155,694                                                      Page 1 of 1
DATED        : December 5, 2000
INVENTOR(S)  : Lyons et al.

It is certified that error appears in the above-identified patent and that said Letters Patent is hereby corrected as shown below:

Column 9,
Line 2, before "incandescent" insert -- first --.
Line 7, before "lamp" insert -- first --.
Line 35, before "light" insert -- first --.

Column 11,
Line 19, before "second" (first occurrence) insert -- means supporting said --.
Line 34, after "plane" delete ":" and insert -- ; --.
Line 43, after "light" delete ":" and insert -- ; --.

Signed and Sealed this

First Day of April, 2003

JAMES E. ROGAN
*Director of the United States Patent and Trademark Office*